US010232251B1

(12) United States Patent
Pieron

(10) Patent No.: US 10,232,251 B1
(45) Date of Patent: Mar. 19, 2019

(54) SYSTEM AND METHOD FOR PROVIDING A TIERED REBATE SYSTEM TO A USER

(71) Applicant: ELECTRONIC ARTS INC., Redwood City, CA (US)

(72) Inventor: Luc Pieron, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 558 days.

(21) Appl. No.: 13/902,574

(22) Filed: May 24, 2013

(51) Int. Cl.
A63F 9/24 (2006.01)
A63F 13/00 (2014.01)
G06F 17/00 (2006.01)
G06F 19/00 (2018.01)
A63F 13/30 (2014.01)

(52) U.S. Cl.
CPC .................... A63F 13/12 (2013.01)

(58) Field of Classification Search
CPC ........... G06Q 30/0209; G06Q 30/0207; G06Q 30/0234
See application file for complete search history.

(56) References Cited

U.S. PATENT DOCUMENTS

| 4,932,485 | A  | * | 6/1990  | Mori ................. G01G 19/4144 177/245 |
| 7,720,733 | B2 |   | 5/2010  | Jung et al. ...................... 705/35 |
| 8,255,269 | B1 | * | 8/2012  | Aued .................... G06Q 30/02 705/7.35 |
| 8,272,956 | B2 |   | 9/2012  | Kelly et al. ...................... 463/31 |
| 8,285,588 | B2 |   | 10/2012 | Postrel .......................... 705/14.1 |
| 8,333,653 | B2 |   | 12/2012 | Nyman et al. .................. 463/25 |
| 8,348,762 | B2 |   | 1/2013  | Willis ............................. 463/42 |
| 8,353,761 | B2 |   | 1/2013  | Kelly et al. ..................... 463/27 |
| 8,357,034 | B2 |   | 1/2013  | Smith et al. .................... 463/25 |
| 8,777,754 | B1 | * | 7/2014  | Santini .................... G07F 17/32 463/42 |
| 2001/0047299 | A1 | * | 11/2001 | Brewer ................. G06Q 30/02 705/14.13 |
| 2003/0018523 | A1 | * | 1/2003  | Rappaport ........... G06Q 20/204 705/14.12 |
| 2003/0069787 | A1 | * | 4/2003  | Tendon ................ G06Q 30/02 705/14.28 |
| 2004/0088222 | A1 | * | 5/2004  | Suzuki .................. G06Q 30/02 705/14.13 |
| 2004/0127217 | A1 | * | 7/2004  | Aoki .................... G08G 1/0962 455/435.1 |
| 2005/0143166 | A1 | * | 6/2005  | Walker ................ G07F 17/3244 463/25 |
| 2006/0129456 | A1 | * | 6/2006  | Walker .................. G06Q 30/02 705/14.38 |
| 2007/0124239 | A1 | * | 5/2007  | Jung ...................... G06Q 20/06 705/38 |

(Continued)

Primary Examiner — Milap Shah
Assistant Examiner — Jason Pinheiro
(74) Attorney, Agent, or Firm — Knobbe, Martens, Olson & Bear, LLP

(57) ABSTRACT

One aspect of the disclosure relates to providing a tiered rebate system in an online game. The users may spend over a certain time period and based on spending during that time frame, receive a certain amount of what the user spent back. Thus, the user receives a tiered rebate which may correlate to one or more of user spend frequency, user spend velocity, a total amount spent, and/or any other metrics.

16 Claims, 5 Drawing Sheets

(56) References Cited

U.S. PATENT DOCUMENTS

| | | | | |
|---|---|---|---|---|
| 2007/0278288 A1* | 12/2007 | Simmons | G06Q 20/387 | 235/380 |
| 2009/0094051 A1* | 4/2009 | Ard | G06Q 50/22 | 705/2 |
| 2009/0292585 A1* | 11/2009 | Seo | G06Q 10/087 | 705/14.58 |
| 2010/0131410 A1* | 5/2010 | Clement | G06Q 30/02 | 705/50 |
| 2010/0161399 A1* | 6/2010 | Posner | G06Q 30/02 | 705/14.13 |
| 2011/0106602 A1* | 5/2011 | Gebhardt | G06Q 30/0215 | 705/14.17 |
| 2011/0106607 A1* | 5/2011 | Alfonso | G06Q 30/02 | 705/14.25 |
| 2011/0264494 A1* | 10/2011 | Lechowicz | G06Q 30/0209 | 705/14.12 |
| 2011/0288924 A1* | 11/2011 | Thomas | G06Q 30/02 | 705/14.25 |
| 2012/0158480 A1* | 6/2012 | Sundaram | G06Q 10/087 | 705/14.23 |
| 2012/0173323 A1* | 7/2012 | Barlow | G06Q 30/0207 | 705/14.24 |
| 2012/0226539 A1* | 9/2012 | Feuerstein | G06Q 30/02 | 705/14.23 |
| 2012/0238353 A1* | 9/2012 | Herrmann | G06Q 30/02 | 463/25 |
| 2012/0240155 A1 | 9/2012 | Walker et al. | | 725/34 |
| 2012/0310826 A1 | 12/2012 | Chatterjee | | 705/41 |
| 2012/0323669 A1* | 12/2012 | Kohlmeier | G06Q 30/06 | 705/14.38 |
| 2013/0017886 A1 | 1/2013 | Van Luchene | | 463/26 |
| 2013/0036064 A1 | 2/2013 | Osvald et al. | | 705/319 |
| 2013/0095910 A1* | 4/2013 | Chu | G06Q 30/0209 | 463/25 |
| 2013/0166362 A1* | 6/2013 | Sutton | G06Q 30/0223 | 705/14.13 |
| 2013/0166367 A1* | 6/2013 | Stouffer | G06Q 30/0226 | 705/14.25 |
| 2013/0218664 A1* | 8/2013 | Carlson | G06Q 30/0244 | 705/14.43 |
| 2013/0262214 A1* | 10/2013 | Baird | G06Q 30/0207 | 705/14.33 |
| 2013/0262227 A1* | 10/2013 | Lin | G06Q 30/0224 | 705/14.53 |
| 2014/0164094 A1* | 6/2014 | Bhatia | G06Q 30/0251 | 705/14.41 |

\* cited by examiner

SYSTEM AND METHOD FOR PROVIDING A
TIERED REBATE SYSTEM TO A USER

FIELD

The disclosure relates to providing a tiered rebate system to a user of an online game.

BACKGROUND

Various techniques for providing promotions for purchasing in-game items during a certain time frame are known. In conventional systems, players may see a promotion for a virtual item during a time frame and decide to purchase the item. When the promotion is over, players who did not purchase the item during the promotional time period may not want to pay full price to purchase the item since it was previously marked down.

SUMMARY

One aspect of the disclosure relates to providing a tiered rebate system in an online game. The users may spend over a certain time period and based on spending during that time frame, receive a certain amount of what the user spent back. Thus, the user receives a tiered rebate which may correlate to one or more of user spend frequency, user spend velocity, a total amount spent, and/or any other metrics.

A system configured to facilitate providing a tiered rebate to a user of an online game may include one or more processors configured to execute compute program modules. The program modules may comprise a user module, a game module, an interaction module, a network module, a store module, an event spend parameter module, an event rebate module, a rebate distribution module, and/or any other modules.

The game module may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

A store module may be configured to present a store interface to the users. The store interface may present offers to users to buy item instances of virtual items. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

An event spend parameter module may be configured to determine spend parameter values of a spend parameter for the users during an event time period. A spend parameter value may be determined for the first user during the event time period and/or during any other time. The event spend parameter module may be configured to determine a start time and an end time for the event time period and/or for any other period. The event spend parameter module may be configured such that the spend parameter includes one or more of: a spend velocity, a spend frequency, a total amount spent and/or other parameters. The event spend parameter module may be configured to determine the spend parameter value for the first user during the event time period. The spend parameter value for the first user may characterize one or more aspects of spending by the first user on virtual items through the store interface during the event time period.

An event rebate module may be configured to determine rebates based on spend parameters for the users during an event time period. A rebate may be determined for the first user during the event time period and/or during any other time.

The event rebate module may be configured such that the rebates are determined as a calculated percentage rebate off total amounts spent during the event time period and/or during any other time. The event rebate module may be configured such that the percentage used to determine a calculated percentage rebate for the first user is determined based on the spend parameter value for the first user during the event time period and/or during any other time. The event rebate module may be configured such that the rebates are provided based on a customary rebate off total amounts spent during the event time period. The event rebate module may be configured such that the rebates are based on user level in the game and/or any other in-game parameter. The event rebate module may be configured to determine if the user obtains above a threshold spend parameter value during the promotion time period and/or during any other time.

A rebate distribution module may be configured to provide the one or more rebates to a user within the game space. The rebate distribution module may be configured to distribute the rebates upon conclusion of the event time period and/or during any other time.

The system may comprise a user module configured to store inventories of virtual items that are available to users in the game space. The inventories may include a first inventory and/or any other inventory of virtual items available to a first user in the game space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
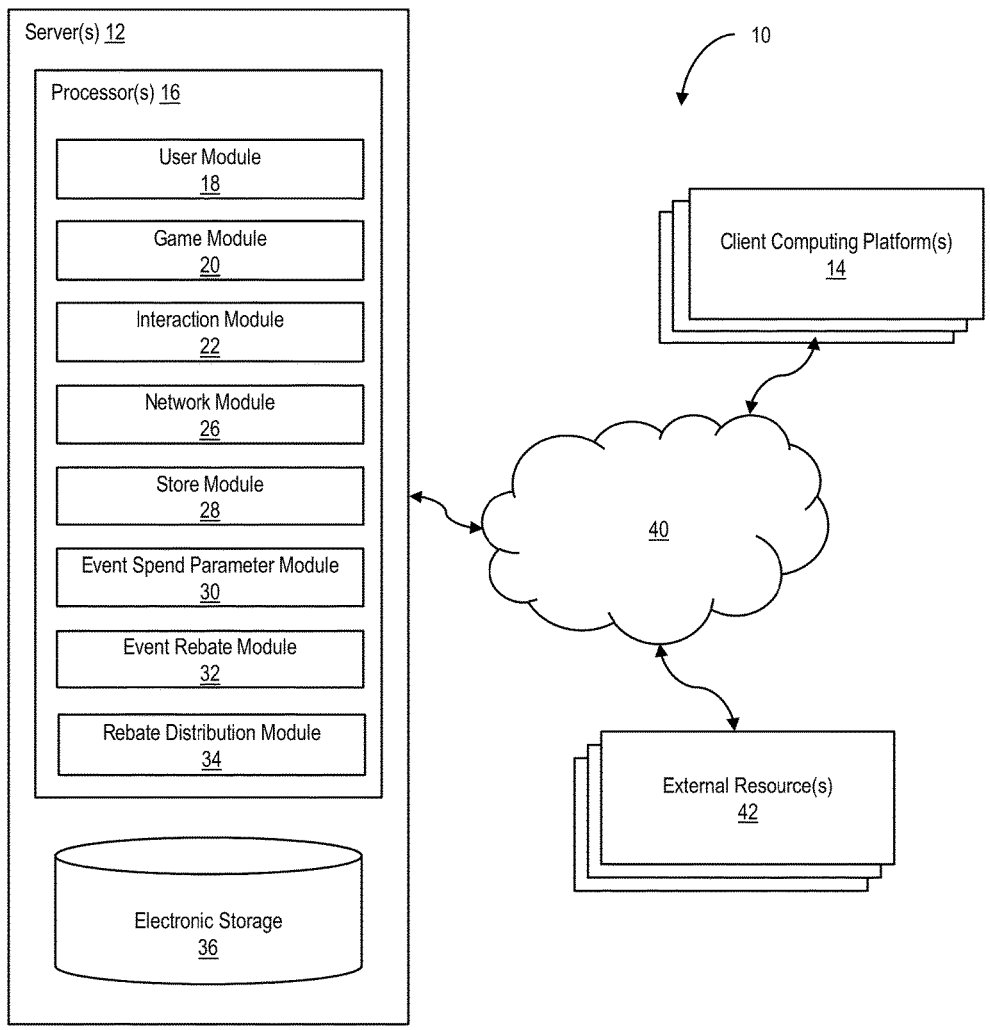
FIG. 1 illustrates an exemplary system configured to provide a tiered rebate system to a user of an online game, according to an aspect of the invention.

FIG. 1 illustrates a system 10 configured facilitate providing a tiered rebate system to a user of an online game, according to an aspect of the invention. The program modules may comprise a user module 18, a game module 20, an interaction module 22, a network module 26, a store module 28, an event spend parameter module 30, an event rebate module 32, a rebate distribution module 34 and/or any other modules. In some implementations, system 10 may include a game server(s) 12. The game server(s) 12 may host a game space in which an online game takes place. The game server(s) 12 may be configured to communicate with one or more client computing platforms 14 according to a client/server architecture. The users may access system 10 and/or the virtual space via client computing platforms 14.

The game server(s) 12 may be configured to execute one or more computer program modules. The computer program modules may include one or more of a user module 18, a game module 20, an interaction module 22, a network module 26, a store module 28, an event spend parameter module 30, an event rebate module 32, a rebate distribution module 34 and/or any other modules.

The user module 18 may be configured to access and/or manage one or more user profiles and/or user information associated with users of the system 10. The one or more user profiles and/or user information may include information stored by game server(s) 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user module 18 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

The game module 20 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

The game module 20 may be configured to implement the instance of the virtual space executed by the computer modules to determine state of the virtual space. The state may then be communicated (e.g., via streaming visual data, via object/position data, and/or other state information) from server(s) 12 to client computing platforms 14 for presentation to users. The state determined and transmitted to a given client computing platform(s) 14 may correspond to a view for a user character being controlled by a user via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 20 is not intended to be limiting. The game module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through game module 20).

The interaction module 22 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 22 in monitoring the interactions of the users may be stored to the user profiles managed by user module 18.

At a given time, interaction module 22 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 22 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

Network module 26 of the game server(s) 12 may be configured to maintain a connection to the one or more client computing platforms 14. For example, the network module 26 may maintain one or more communication lines or ports to enable connection and/or exchange of information with a network 40 and/or other computing platforms 14. Information such as state information, game state and game logic may be communicated via network module 26. The network module may be configured to receive information from the client computing platform(s) 14 as well.

A store module 28 may be configured to present a store interface to the users. The store interface may present offers to users to buy item instances of virtual items. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module 28 may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module 28 may be configured such that the offers presented to the first user may be restricted to offers having prices in a first price range. The first price range may be determined based on the user metric for the first user, and/or the user metric for other users. The store module 28 may be configured such that the first price range may change as participation by the first user in the game causes the user metric for the first user to change. The store module 28 may be configured such that the first price range may be bounded by one or more both of a minimum value and/or a maximum value. The store module 28 may be configured such that the offers having prices below the minimum value may not be available for purchase by the first user. The store module 28 may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

An event spend parameter module 30 may be configured to determine spend parameter values of a spend parameter for the users during an event time period. A spend parameter value may be determined for the first user during the event time period and/or during any other time.

The event spend parameter module 30 may be configured to obtain a start time and an end time for the event time period and/or for any other period. The start time and end time may be displayed to the player, and/or the player may be unaware of the start and end time.

The event spend parameter module 30 may be configured such that the spend parameter includes one or more of: a spend velocity, a spend frequency, a total amount spent and/or other parameters. The spend velocity may be related to how quickly a user acquires virtual in-game items. The spend frequency may be related to the number of times a user purchases virtual in-game items. The total amount spent may determine the total amount the user has spent on obtaining virtual in-game items. The event spend parameter module 30 may be configured to determine the spend parameter value for the first user during the event time period. The spend parameter value for the first user may characterize one or more aspects of spending by the first user on virtual items through the store interface during the event time period.

An event rebate module 32 may be configured to determine rebates based on spend parameters for the users during an event time period. A rebate may be determined for the first user during the event time period and/or during any other time.

The event rebate module 32 may be configured such that the rebates are determined as a calculated percentage rebate off total amounts spent during the event time period, as specific rebate amounts, and/or determined as other types of rebates. The event rebate module 32 may be configured such that the percentage used to determine a calculated percentage rebate for the first user is determined based on the spend parameter value for the first user during the event time period and/or during any other time. The event rebate module 32 may be configured such that the rebates may be provided based on a customary rebate off total amounts spent during the event time period. The event rebate module may be configured such that the rebates are based on user level in the game and/or any other in-game parameter. The event rebate module 32 may be configured to determine if the user obtains above a threshold spend parameter value during the promotion time period and/or during any other time.

The event rebate module 32 may also provide rebates based on parameters other than the total amount spent. Some of these parameters may comprise one or more of: time spend playing the game, virtual items acquired in the game, level achieved in the game, and/or any other game related parameter.

In some implementations, the rebate module 32 may be configured such that the modified instances are configured to be activated by the users in the game space during time periods other than the event time period to obtain the one or more first in-game benefits. The one or more first in-game benefits may be provided to the user responsive to a determination that at least one of the modified instances is activated by the user during a time period other than the event time period.

In some implementations, a user may spend over a certain time frame and then at the end of that time frame, the user may receive a certain amount of what the user spent back. There may be several tiers to this example. If a user spends 500 units of virtual currency, the user may receive 100 units of virtual currency back. The rebate may increases once the user hits the larger tiers of spending. For example, if the user spends 1,000 units of virtual currency, the user may get 300 back. If the user spends 2,000 units of virtual currency, the user might receive a rebate of 1,000 units of virtual currency.

A rebate distribution module 34 may be configured to provide the one or more rebates to a user within the game space. The rebate distribution module 34 may be configured to distribute the rebates upon conclusion of the event time period and/or during any other time. In some implementations, the user may be aware of the event time period. In some implementations, the user may not be aware of the event time period.

The system may comprise a user module configured to store inventories of virtual items that are available to users in the game space. The inventories may include a first inventory and/or any other inventory of virtual items available to a first user in the game space.

The game server(s) 12, client computing platform(s) 14, and/or external resource(s) 42 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 42 may be operatively linked via some other communication media.

Game server(s) 12 may include electronic storage 34, one or more processors 16, and/or other components. Game server(s) 12 may include communication lines, or ports to enable the exchange of information with a network 46 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 34 may comprise non-transitory storage media that electronically stores information. The electronic storage media of Electronic storage 34 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 34 may include one or more virtual storage resources (e.g., cloud storage, a virtual private network, and/or other virtual storage resources). Electronic storage 34 may store software algorithms, information determined by processor 16, information received from game server(s) 12, information received from client computing platforms 14, and/or other information that enables game server(s) 12 to function as described herein.

Processor(s) 16 is configured to provide information processing capabilities in game server(s) 12. As such, processor 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 26, 28, 30, and/or 32. Processor(s) 16 may be configured to execute modules 18, 20, 22, 26, 28, 30, and/or 32 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 26, 28, 30, and/or 32 are illustrated in FIG. 1 as being implemented within a single processing unit, in implementations in which processor includes multiple processing units, one or more of modules 18, 20, 22, 26, 28, 30, and/or 32 may be implemented remotely from the other modules. The description of the functionality provided by the different modules 18, 20, 22, 26, 28, 30, and/or 32 described below is for illustrative purposes, and is not intended to be limiting, as any of modules 18, 20, 22, 26, 28, 30, and/or 32 may provide more or less functionality than is described. For example, one or more of modules 18, 20, 22, 26, 28, 30, and/or 32 may be eliminated, and some or all of its functionality may be provided by other ones of modules 18, 20, 22, 26, 28, 30, and/or 32. As another example, processor 16 may be configured to execute one or more additional modules that may perform some or all of the functionality attributed below to one of modules 18, 20, 22, 26, 28, 30, and/or 32.

A given client computing platform(s) 14 may include one or more processors configured to execute computer program modules. The computer program modules may be configured to enable an expert or user associated with the given client computing platform(s) 14 to interface with system 10, game server(s) 12, and/or external resources 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 42 may include sources of information, hosts and/or providers of virtual spaces outside of system 10, external entities participating with system 10, and/or other resources. In some implementations, some or all of the functionality attributed herein to external resources 36 may be provided by resources included in system 10.

Figure 2:
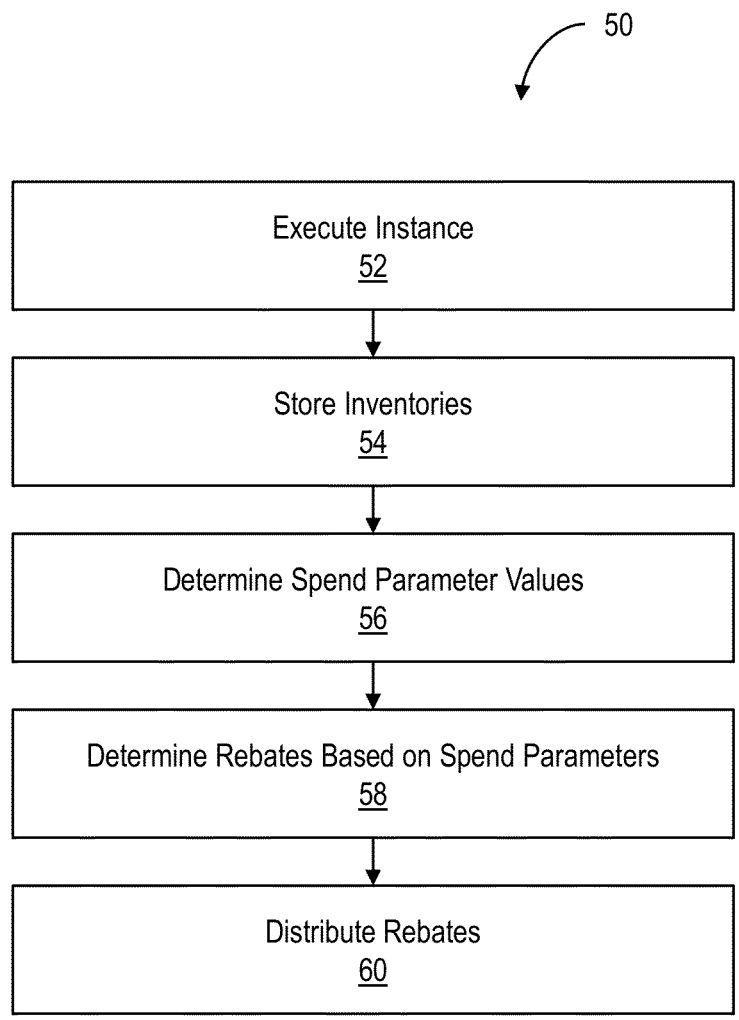
FIG. 2 illustrates an exemplary method of providing a tiered rebate system to a user of an online game, according to an aspect of the invention.

FIG. 2 illustrates a method 50 configured to facilitate providing a tiered rebate system to a user of an online game, according to an aspect of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a game module the same as or similar to game module 20 (shown in FIG. 1 and described above).

At an operation 54, the executed instance of the virtual space may be implemented to store inventories. The view information may define views to be presented to users via client computing platforms. In some implementations, operation 54 may be performed by a user module the same as or similar to user module 18 (shown in FIG. 1 and described above).

At an operation 56, spend parameters of a user may be determined. A start time and an end time for the event time period may be determined. Spend parameters may include one or more of: a spend velocity, a spend frequency, or a total amount spent. The spend parameter value for the first user may be determined during the event time period which characterizes one or more aspects of spending by the first user on virtual items through the store interface during the event time period. In some implementations, operation 56 may be performed by an event spend parameter module the same as or similar to event spend parameter module 30 (shown in FIG. 1 and described above).

At an operation 58, the rebates must be determined based on spend parameters for the users during an event time period such that a rebate is determined for the first user during the event time period. In some implementations, operation 58 may be performed by an event rebate module the same as or similar to event rebate module 32 (shown in FIG. 1 and described above).

At an operation 60, one or more rebates may be provided to a user within the game space. In some implementations, operation 60 may be performed by a rebate distribution module the same as or similar to rebate distribution module 34 (shown in FIG. 1 and described above).

Figure 3:
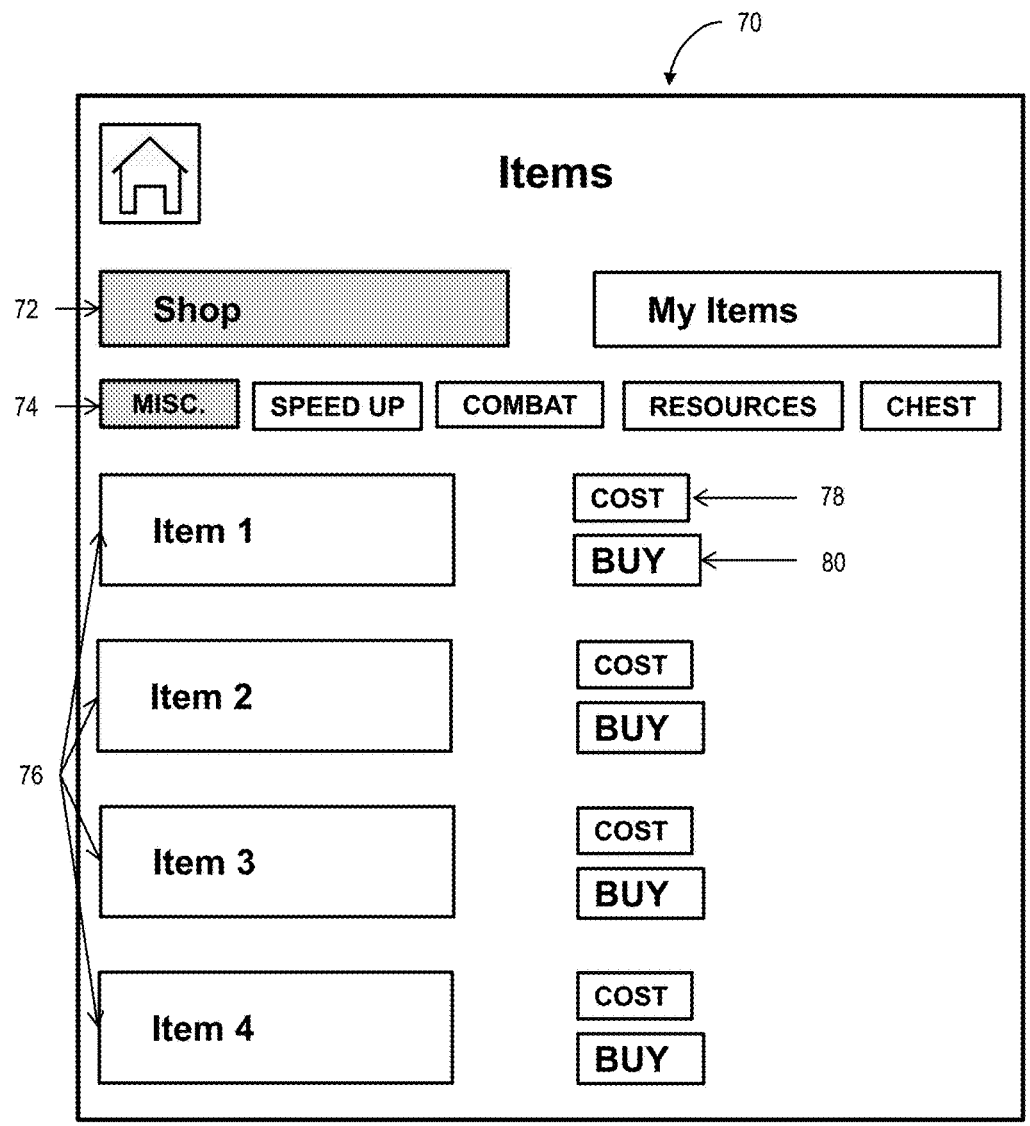
FIG. 3 illustrates an exemplary diagram of a user interface which provides a tiered rebate system to a user of an online game, according to an aspect of the invention.

FIG. 3 illustrates an exemplary diagram of a user interface 70 which provides a tiered rebate system to a user of an online game, according to an aspect of the invention. As shown, user interface 70 enables a user to purchase virtual items for in-game use. In some implementations, the user may select the shop tab 72, and select from a category 74 of virtual in-game goods to purchase. In some implementations, the categories may include one or more: miscellaneous, speed up, combat, resources, chest, and/or any other category. Each category contains lists of items 76 for a user to purchase. The user interface 70 displays the cost 78 of each item to the user, and allows purchase of the item 80. For each user, the cost 78 or each item may differ based on user metrics. For each user, a different set of items 76 may be available for purchase depending on user metrics.

Figure 4:
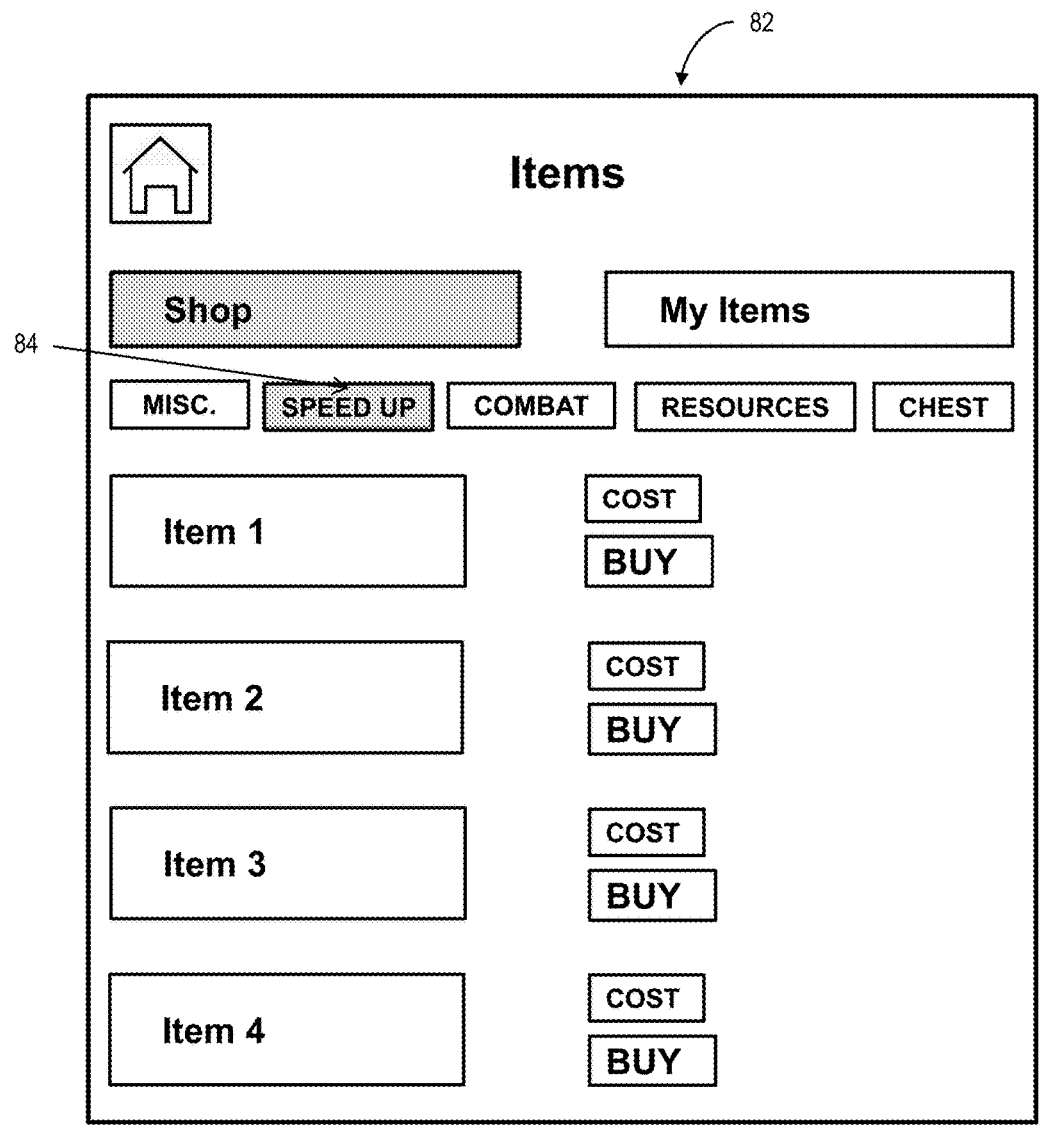
FIG. 4 illustrates an exemplary diagram of a user interface which provides a tiered rebate system to a user of an online game, according to an aspect of the invention.

FIG. 4 illustrates an exemplary diagram of a user interface 82 which provides a tiered rebate system to a user of an online game, according to an aspect of the invention. In some implementations, the user may select the shop tab 72, and select from a category 84 of virtual in-game goods to purchase.

It would be understood by one of ordinary skill in the art that the user interfaces may not be limited to the embodiment illustrated in FIGS. 3 and 4. The user interfaces may be associated with any objective, activity, action, or a combination thereof.

Figure 5:
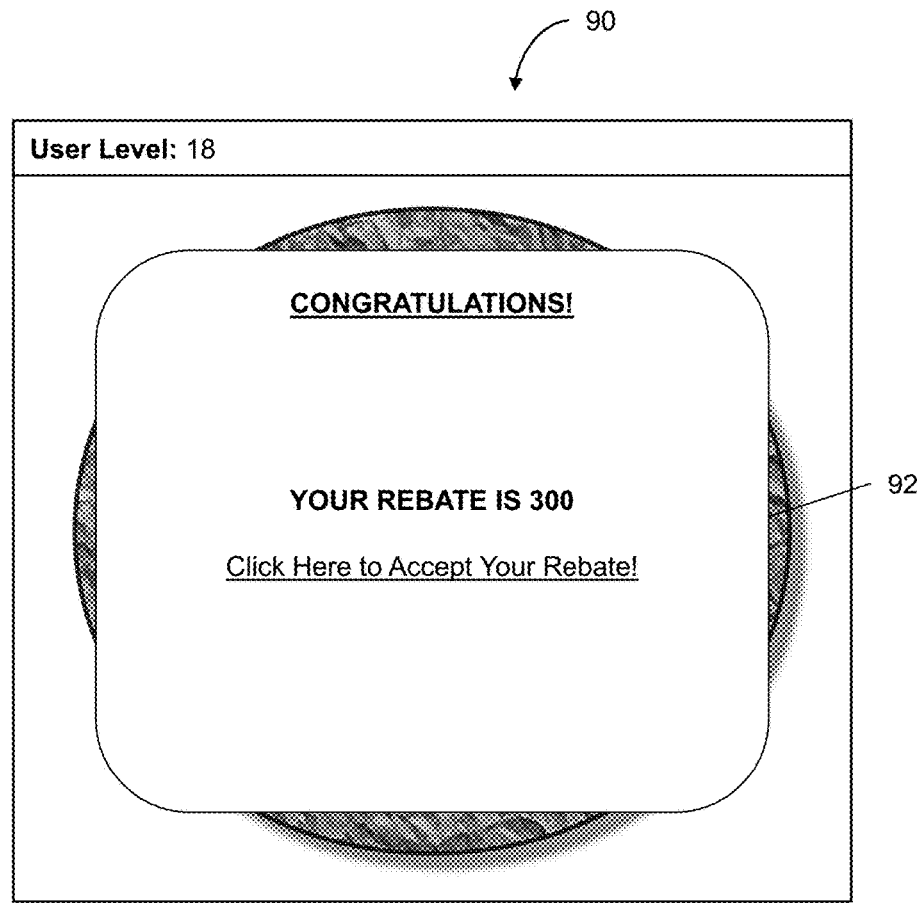
FIG. 5 illustrates an exemplary diagram of a user interface which provides a tiered rebate system to a user of an online game, according to an aspect of the invention.

FIG. 5 illustrates an exemplary diagram of a user interface 90 which provides a tiered rebate system to a user of an online game, according to an aspect of the invention. After a determination of the spend parameter values of a spend parameter for the users during an event time period and rebates based on the spend parameters are determined, the one or more rebates are provided to a user within the game space 92. It would be understood by one of ordinary skill in the art that the user interface may not be limited to the embodiment illustrated in FIG. 5. The user interface 90 may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing a tiered rebate system to users in an online game, the system comprising:
   one or more processors configured by machine-readable instructions to:
   execute a game instance of a game space in which the online game is played, and to facilitate presentation of views of the game space to the users, wherein the game space is configured to facilitate interaction of the users with the game space and/or each other by performing operations in the game space in response to commands received from the users, wherein the users control one or more virtual entities within the game space, wherein the users include a first user controlling a first virtual entity;
   present a store interface to the users, wherein the store interface presents offers to users to buy item instances of virtual items associated with in-space promotions, wherein the virtual items are purchasable using a first virtual currency and are usable in association with the virtual entities within the game space, wherein the virtual items include a first virtual item;

obtain spend velocities for the users during an event time period such that a spend velocity indicating an amount of the first virtual currency spent in the online game per unit time by a first user in the online game is determined for the first user during the event time period wherein the event time period includes a promotion time period that is predetermined and has a start time and an end time that is the same for the users without regard to the spend velocities for individual ones of the users;

determine rebates based on the spend velocities for the users during the event time period such that, responsive to a determination that the spend velocity obtained by first user reaches the threshold spend velocity during the event time period, a first rebate is determined for the first user during the event time period based on the spend velocity indicating the rate of spending of the first user wherein the first rebate is a first amount of the first virtual currency; and provide the one or more rebates to the users within the game space such that the first rebate including the first amount of virtual currency is provided to the first user.

2. The system of claim 1, wherein the one or more processors are configured by machine-readable instructions to store inventories of virtual items that are available to users in the game space, the inventories including a first inventory of virtual items available to the first user in the game space.

3. The system of claim 1, the one or more processors are configured by machine-readable instructions to determine a start time and an end time for the event time period.

4. The system of claim 1, wherein the one or more processors are configured by machine-readable instructions to determine the spend velocity for the first user during the event time period which characterizes the rate of spending by the first user on virtual items through the store interface during the event time period.

5. The system of claim 1, wherein the one or more processors are configured by machine-readable instructions such that the rebates are determined as a calculated percentage rebate off total amounts spent during the event time period.

6. The system of claim 5, wherein the one or more processors are configured by machine-readable instructions such that the percentage used to determine a calculated percentage rebate for the first user is determined based on the spend velocity for the first user during the event time period.

7. The system of claim 1, wherein the one or more processors are configured by machine-readable instructions such that the rebates are provided based on a customary rebate off total amounts spent during the event time period.

8. The system of claim 1, wherein the one or more processors are configured by machine-readable instructions such that the rebates are based on user level in the game.

9. A computer implemented method for providing a tiered rebate system to users in an online game, the method being implemented in a computer system that includes one or more physical processors configured by machine-readable instructions, the method comprising:

executing an instance of a game space in which the online game is played, and implementing the instance of the game space to facilitate participation by the users in an online game that takes place in the game space, wherein facilitating interaction of the users with the game space and/or each other by performing operations in the game space in response to commands received from the users, wherein the users control one or more virtual entities within the game space, wherein the users include a first user controlling a first virtual entity;

presenting a store interface to the users, wherein the store interface presents offers to users to buy item instances of virtual items associated with in-space promotions, wherein the virtual items are purchasable using a first virtual currency and are usable in association with the virtual entities within the game space, wherein the virtual items include a first virtual item;

obtaining spend velocities for the users during an event time period such that a spend velocity indicating an amount of the first virtual currency spent in the online game per unit time by first user in the online game is determined for the first user during the event time period wherein the event time period includes a promotion time period that is predetermined and has a start time and an end time that is the same for the users without regard to the spend velocities for individual ones of the users;

determining whether the spend velocities for the users reach a threshold spend velocity during the event time period such that whether the spend velocity obtained by first user reaches the threshold spend velocity during the event time period is determined;

determining rebates based on the spend velocities for the users during the event time period such that, responsive to a determination that the spend velocity obtained by first user reaches the threshold spend velocity during the event time period, a first rebate is determined for the first user during the event time period based on the spend velocity indicating the rate of spending of the first user, wherein the first rebate is a first amount of the first virtual currency; and providing the one or more rebates to the users within the game space such that the first rebate including the first amount of virtual currency is provided to the first user.

10. The method of claim 9, the method further comprising storing inventories of virtual items that are available to users in the game space, the inventories including a first inventory of virtual items available to the first user in the game space.

11. The method of claim 9, the method further determining a start time and an end time for the event time period.

12. The method of claim 9, the method further comprising determining the spend velocity for the first user during the event time period which characterizes the rate of spending by the first user on virtual items through the store interface during the event time period.

13. The method of claim 9, wherein the rebates are determined as a calculated percentage rebate off total amounts spent during the event time period.

14. The method of claim 13, wherein the percentage used to determine a calculated percentage rebate for the first user is determined based on the spend velocity for the first user during the event time period.

15. The method of claim 9, wherein the rebates are provided based on a customary rebate off total amounts spent during the event time period.

16. The method of claim 9, wherein the rebates are based on user level in the game.

* * * * *

UNITED STATES PATENT AND TRADEMARK OFFICE
CERTIFICATE OF CORRECTION

PATENT NO. : 10,232,251 B1  
APPLICATION NO. : 13/902574  
DATED : March 19, 2019  
INVENTOR(S) : Luc Pieron Page 1 of 1

It is certified that error appears in the above-identified patent and that said Letters Patent is hereby corrected as shown below:

In the Claims

In Column 13, Line 21, Claim 1, change "user" to --user,--.

Signed and Sealed this
Twenty-fourth Day of November, 2020

Andrei Iancu
*Director of the United States Patent and Trademark Office*